Oct. 11, 1966   W. STRAUSS   3,277,521
MOLDING PRESS STRIPPER COMB ASSEMBLY
Filed Nov. 6, 1963   3 Sheets-Sheet 1
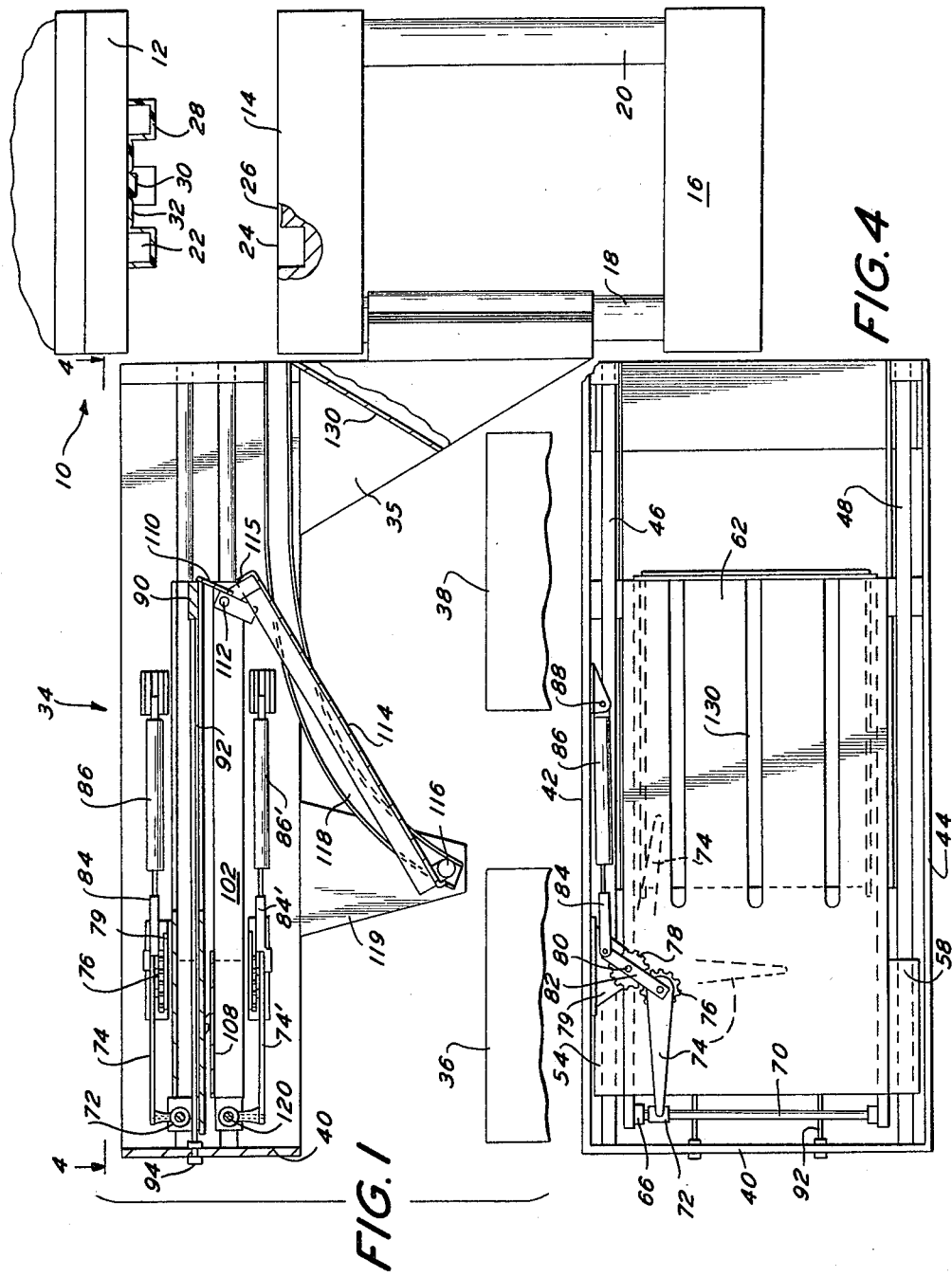

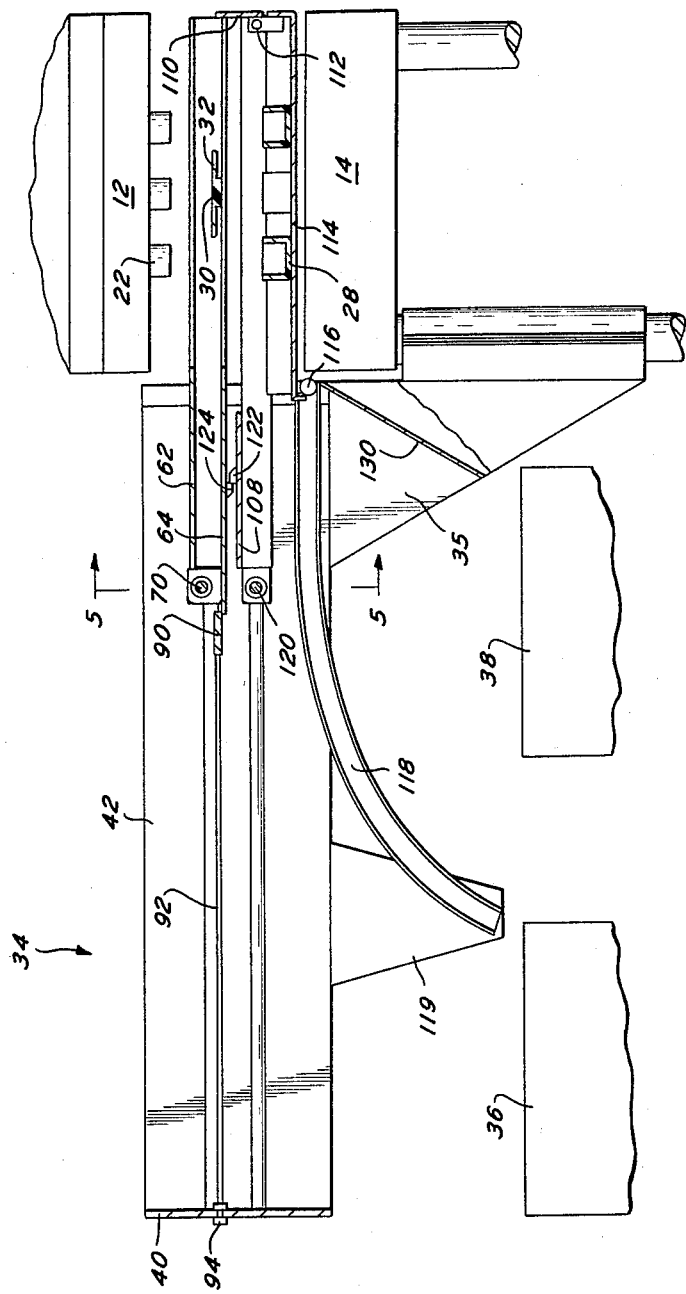

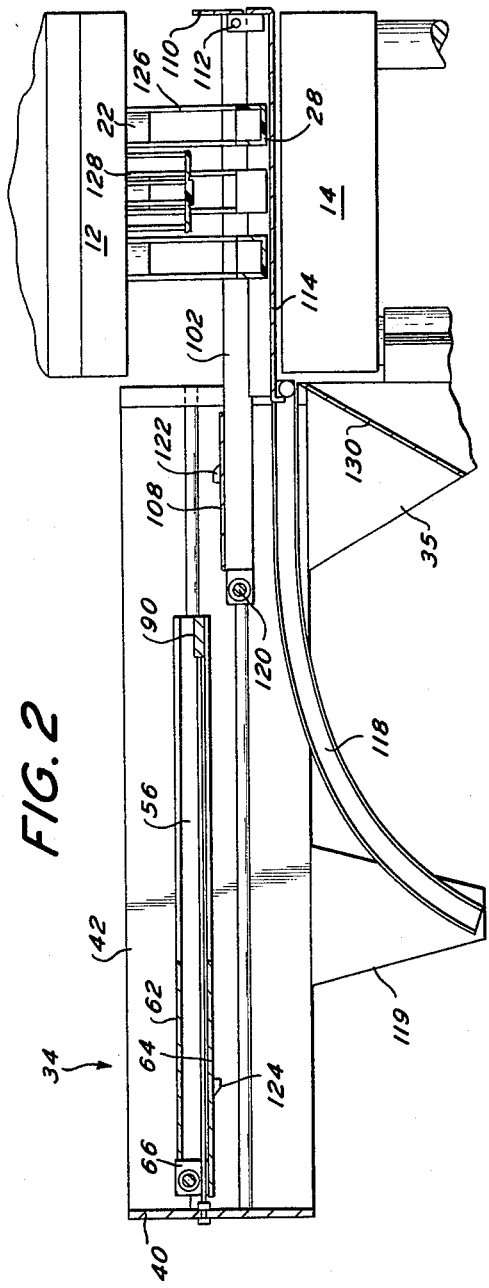
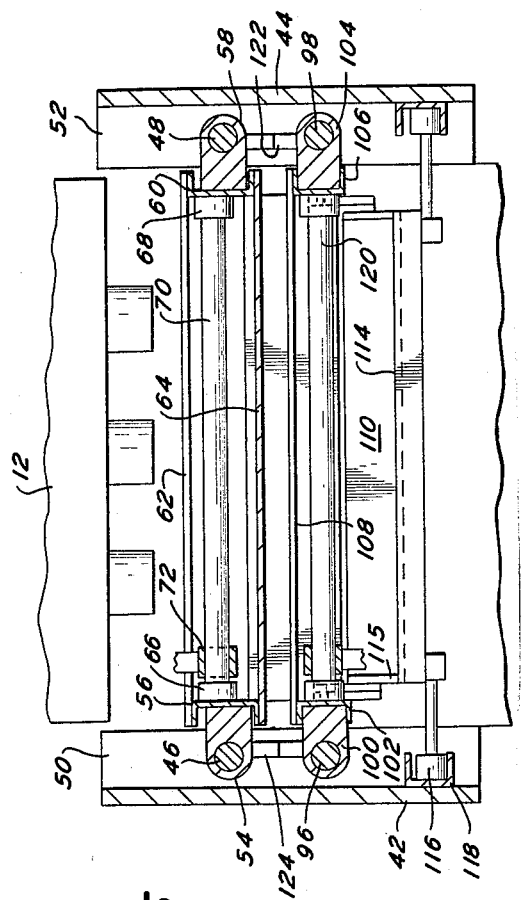
FIG. 2
FIG. 5
INVENTOR.
WILLIAM STRAUSS
BY Arthur H. Seidel
ATTORNEY

United States Patent Office 3,277,521
Patented Oct. 11, 1966

3,277,521
MOLDING PRESS STRIPPER COMB ASSEMBLY
William Strauss, Philadelphia, Pa., assignor, by mesne assignments, to Pennsalt Chemicals Corporation, Philadelphia, Pa., a corporation of Pennsylvania
Filed Nov. 6, 1963, Ser. No. 321,969
11 Claims. (Cl. 18—2)

This invention relates to a stripper comb assembly and, more particularly, to such as assembly having prime utility for use with molding presses.

The stripper comb assembly of the present invention may be utilized with any one of a wide variety of molding presses, such as the molding presses illustrated in my Patents 2,583,891; 2,739,349; 2,923,976, or with other types of conventional presses. The stripper comb assembly of the present invention is particularly adapted for use in molding presses wherein it is desired to automatically separate the molded article from the cull and runner.

In accordance with the present invention, the stripper comb assembly includes a reciprocably mounted tray assembly above which is provided a separately actuable double comb assembly. After the stripping operation, the cull and runner will be disposed between the combs on the double comb assembly and the molded parts will be supported by the tray assembly. The separate supports for the molded parts and the cull and runner will enable the components to be automatically separated and discharged into separate containers.

The double combs are provided with an actuating mechanism to facilitate reciprocation of the combs as a unit. The tray assembly is provided with a separate actuator adapted to reciprocally support the same in timed relationship with respect to the combs and the opening and closing movement of the platens of the molding press. The means and relationships which facilitate the automatic separation and discharge of the products from the mold cavities and the electrical circuitry for sequential operation of the combs and tray assembly are well-known to those skilled in the art and may be of the type set forth in my above-identified patents.

It is an object of the present invention to provide a molding press having a stripper comb assembly capable of automatically separating molded parts from the cull and runner for discharge into separate containers or the like.

It is another object of the present invention to provide a novel stripper comb assembly for automatically separating and discharging molded parts, culls and runners into separate accumulation areas.

It is still another object of the present invention to provide a stripper comb assembly wherein molded parts may be separated from culls and runners and conveyed away from the mold cavities in two different planes for discharge into separate containers or accumulation areas.

It is another object of the present invention to provide a novel stripper comb assembly which is automatic, reliable, rapid, and adapted for long periods of repeated usage.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a side elevation view of a portion of a molding press having its platens separated from one another and the stripper comb assembly illustrated in longitudinal section.

FIGURE 2 is a view similar to FIGURE 1 but illustrating the tray assembly in its forward position between the platens of the molding press.

FIGURE 3 is a view similar to FIGURES 1 and 2 with the tray assembly and the double comb assembly in a position between the platens of the molding press.

FIGURE 4 is a top plan view taken along the line 4—4 in FIGURE 1.

FIGURE 5 is a sectional view taken along the line 5—5 in FIGURE 3.

Referring to the drawings in detail, wherein like numerals indicate like elements, there is shown in FIGURE 1 a molding press designated generally as 10 having an upper mold plate 12 and a lower mold plate 14 together with a srtipper comb assembly designated generally as 34.

The upper mold plate 12 is adapted to move toward and away from the lower mold plate 14 by conventional means not illustrated and well-known to those skilled in the art. The lower mold plate 14 is mounted and supported above a base 16 by columns 18 and 20. Mold plate 12 is provided with a plurality of forces 22 on its lower-most face which are adapted to enter the die cavities 24 on the uppermost face of the mold plate 14.

The uppermost face of mold plate 14 is provided with a runner cavity 26 and a cull cavity (unnumbered) through which the moldable material may be introduced into the space between the forces 22 and the cavities 24 of a multicavity mold. The molded products to be formed with the apparatus 10 are designated as 28, and after the molding process will be interconnected with a cull 30 by means of runners 32. The stripper comb assembly 34 is supported alongside of mold plates 12 and 14 and spaced above a floor or other supporting surface in any convenient manner such as by the brackets 35. A container 36 is provided below the assembly 34 for receiving the molded parts 28. A container 38 is provided below the assembly 34 for receiving the cull 30 and runners 32.

The stripper comb assembly 34 includes a rear wall 40 connected to spaced parallel side walls 42 and 44. The ends of the walls 42 and 44 adjacent the mold plates are provided with inturned flanges 50 and 52 respectively. As shown more clearly in FIGURES 4 and 5, rod 46 extends between the rear wall 40 and flange 50. Also, rod 48 extends between wall 40 and flange 52.

A sleeve-like collar 54 is reciprocally supported by the rod 46 and coupled to a channel support 56. A similar collar 58 is slidably supported by the rod 48 and coupled to channel support 60. A top comb 62 is secured to the uppermost surface of the channel supports 56 and 60. A bottom comb 64 is secured to the lowermost surface of the channel supports 56 and 60.

A bearing block 66 on channel support 56 and a bearing block 68 on channel support 60 cooperate to support a rod 70 extending therebetween and at the rear end thereof as is evident more clearly from FIGURE 4. A bushing 72 is reciprocally supported by the rod 70. Bushing 72 is pivotally coupled to actuating arm 74 at one end thereof. The other end of arm 74 is fixedly secured to a floating gear 76. Gear 76 is meshingly engaged with a stationary gear 78 of the same size.

Gear 78 is fixed to a bracket 79 and acts as a stationary rack. A strut 82 is rotatably supported about a pin 80 fixed to the axis of gear 78. One end of strut 82 is rotatably coupled to the axis of rotation of gear 76. The other end of strut 82 is pivotably coupled to a piston rod 84.

Piston rod 84 has one end extending into an actuating cylinder 86. One end of cylinder 86 is rotatably supported by pin 88 on a bracket secured to side wall 42. Motive fluid conduits (not shown) of conventional construction are connected to opposite ends of the cylinder 86 to effect selective reciprocation of the piston rod 84.

As shown more clearly in FIGURE 1, a scraper blade 90 is supported in cantilever fashion from the rear wall 40 by rods 92. The rods 92 are adjustably coupled to the wall 40 by lock nuts 94. The scraper blade 90 is disposed in a plane slightly above the uppermost surface of the bottom comb 64 for a purpose to be made clear hereinafter. The length of the scraper blade 90 is slightly less than the width of the bottom comb 64.

As shown more clearly in FIGURE 5, a rod 96 is disposed below the rod 46 and extends between the rear wall 40 and the flange 50. A rod 98 is disposed below the rod 48 and extends between the flange 52 and the wall 40. A sleeve-like collar 100 is reciprocally supported by the rod 96 and coupled to a channel support 102. A similar collar 104 is reciprocally supported by the rod 98 and coupled to a channel support 106. The channel supports 102 and 106 are interconected by a top wall 108 which does not extend for the full length of the channel supports as shown more clearly in FIGURE 2. A front wall 110 is rotatably supported by the ends of the channel supports 102 and 106 by pins 112.

A tray 114 is disposed below the channel supports 102 and 106. The front end of tray 114 is provided with struts 115 pivotally coupled to the pins 112. The opposite end of the tray 114 is provided with a roller 116 which is in rolling engagement with a track 118. A horizontally disposed portion of the track 118 is supported by the bracket 35. The free end of an arcuate portion of the track 118 is supported by a bracket 119 depending from the side wall 42. It has been determined that only one track and roller is necessary. If desired, identical roller 116 and track 118 may be provided on the opposite side of the tray 114 as illustrated in FIGURE 5.

A rod 120 extends across the rear-most ends of the channel supports 102 and 106 as shown more clearly in FIGURES 1 and 2. An actuating means is coupled to the rod 120 for selective reciprocation of the same. The actuating means corresponds identically with that described above. Accordingly, corresponding primed numerals are provided in FIGURE 1 for the actuating means. In FIGURE 2, the actuating means for the combs and the tray assembly has not been illustrated for purposes of clarity.

The remaining components of the present invention and the apparatus illustrated will be more clearly described in connection with the operation thereof. The press 10 and stripper comb assembly 34 is operated as follows:

When the molded parts and runner of the previous cycle have been ejected from the press 10, a fresh charge of plastic or moldable material will be introduced into a transfer pot or the like. The mold plates 12 and 14 will move in juxtaposition corresponding to a closed position of the press. When the press is fully closed, a transfer ram advances to fill the runners and the cavities with molding material. The transfer ram remains under pressure for a predetermined length of time as set on a transfer ram timer.

When the transfer ram timer times out, the press sits idle under clamp pressure until the time for a screw to start rotating. This is an adjustable time period to permit screw rotation to be completed just as the press cure time is completed. When the idling timer times out, the screw starts rotating to prepare a charge for the next cycle. When screw rotation has been completed for a required charge size, the screw stops and the press opens. The apparatus for effecting the operation described so far is not illustrated and conventional and thereby forms no part of the present invention.

When the mold plates 12 and 14 are in their open disposition as illustrated in FIGURE 1, the molded parts 28, cull 30 and runners 32 will be supported by the upper mold plate 12. If desired, air discharge nozzles may be activated to introduce air blasts into the cavities to clear off any flash or the like. Thereafter, the tray 114 will be advanced to the position illustrated in FIGURE 2. By conventional means not shown, ejector pins 126 will strip the molded parts 28 to the position illustrated in FIGURE 2. During this stripping operation, some of the parts 28 may drop onto the tray 114 and others may remain attached to the ends of the ejector pins 126. Prior to the ejector pins 126 assuming their fully extended position as illustrated in FIGURE 2, pins 128 will move the cull 30 and runners 32 to the combing level illustrated in FIGURE 2.

With the elements as illustrated in FIGURE 2, the motive fluid is introduced into cylinder 86 to reciprocate the piston rod 84 to the left in FIGURE 4. Such reciprocation causes rotation of the floating gear 76 and strut 82 in a counterclockwise direction in FIGURE 4. Since the gear 76 is in meshing engagement with gear 78, gear 76 rotates about its axis and rotates about the axis of pin 80 in epicyclic fashion. Since arm 74 is coupled to gear 76, arm 74 moves from the solid position in FIGURE 4 to the phantom position illustrated therein. The centrally disposes phantom position of arm 74 is an intermediate position. The furthermost to the right phantom position in FIGURE 4 is a final position of the arm 74. When the arm 74 reaches the last-mentioned phantom position, the combs 62 and 64 will be in the position illustrated in FIGURE 3, with the cull 30 and runner 32 trapped between the combs. Slots 130 are provided in the combs 62 and 64 to prevent interference of the combs with the stripper pins 126 and 128. No attempt has been made to accurately illustrated the arm 74 and its actuating mechanism to a proper scale. It is believed that the operation and function of arm 74 is sufficiently clear from the illustration in the drawings and the above description. It will, of course, be obvious to those skilled in the art that bushing 72 reciprocates along rod 70 during the rotative movement of the arm 74. Rotative movement of arm 74 is slightly less than 180 degrees.

With the elements assuming the positions illustrated in FIGURE 3, the molded parts 28 are on one level and the cull 30 with the runners 32 are on a level thereabove. Thereafter, the actuating mechanism for the tray assembly 114 is reversed. Due to the interengagement between the lugs 122 on the collars 100 and 104 and the lugs 124 on the collars 54 and 58, movement of the tray 114 to the position illustrated in FIGURE 1 results in the following: (1) the combs 62 and 64 will be returned to the position illustrated in FIGURE 1; (2) roller 116 will follow track 118 and tray 114 will pivot to the position illustrated in FIGURE 1 wherein the molded parts 28 will be discharged into the container 36; (3) the cull 30 and runner 32 will be transported by the bottom comb 64 to the left in FIGURES 1 and 3 until they pushed off the free ends of the comb fingers by the scraper blade 90 whereby the cull 30 and runner 32 will bounce off partition 130 and enter container 38.

It will be obvious to those skilled in the art that the molded parts will be supported by the tray 114 and the cull 30 and runner 32 supported by the comb 64 due to the retraction of the pins 126 and 128. Retraction of the pins 126 and 128 is effected by conventional apparatus (not shown) prior to movement of the tray 114 and the combs from the position illustrated in FIGURE 3 to the position illustrated in FIGURE 1. The interlock provided by the lugs 122 and 124 assures simultaneous return movement as described above with the tray 114 being the prime mover.

It will be noted that the front wall 110 on the tray 114 extends high enough so that the cull 30 and runners 32 will not slide off the free end of the teeth on the combs until the combs 62 and 64 are in the position illustrated in FIGURE 1 at which point the wall 110 rotates to the position illustrated in FIGURE 1 thereby enabling the scraper blade 90 to push the cull 30 and runners 32 off the free ends of the teeth on the comb 64.

Thereafter, the cycle of operation as set forth above may be repeated as a result of the circuitry and other components which are well-known to those skilled in the art whereby an automatically operated press will be provided and, as described above, the molded parts and the cull and runner will be automatically separated into separate accumulation areas. As soon as the containers 36 and 38 are filled, they may be replaced with empties. Once the press is operating, periodic replacement of the containers 36 and 38 is the only maintenance or attention required by the operator.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a molding press adapted to produce molded part members interconnected by a runner member, a stripper comb assembly structurally interrelated with said press to automatically receive the members when the press is open and carry the members to a position away from the press so that the press may be immediately recycled, said assembly being constructed to discharge one of said members into a first accumulation area and the others of said members into a second accumulation area, said assembly including a reciprocal tray for receiving and carrying one of said members out of said press, said assembly including a reciprocal comb for receiving the other of said members and carrying the same out of said press, said assembly including a track extending downwardly and away from said press, said tray having structure guided by said track, said tray being tilted by said track during movement of the assembly away from said press, said assembly including means for guiding said comb in a horizontal path during said movement of the assembly away from the press.

2. Apparatus in accordance with claim 1 including an interlock for insuring positive simultaneous movement of the comb and tray in a direction away from the molding press.

3. Apparatus in accordance with claim 1 including ejector pins for moving a molded part to a first level, separate ejector pins for moving a cull and runner to a second level, said second level being below the uppermost surface on said comb.

4. A stripper comb assembly adapted to be utilized in conjunction with a molding press or the like comprising a support, a tray assembly reciprocally supported by said support, top and bottom combs coupled together for movement as a unit and supported by said support, means for pivoting one end of said tray assembly about a horizontal axis, said combs mounted for horizontal reciprocation above said tray assembly, means for actuating said combs and tray assembly, and said support including means for guiding the other end of said tray assembly for movement through an arc during its reciprocal movement.

5. A stripper comb assembly adapted to be utilized in conjunction with a molding press comprising a tray assembly mounted for reciprocation, a front wall on said tray assembly, a comb assembly including a comb mounted for reciprocation above said tray assembly, the uppermost edge of said front wall being above the uppermost edge of said comb in at least one operative disposition of said assemblies.

6. A stripper comb assembly adapted to be utilized with a molding press comprising a stationary support, a tray assembly reciprocally supported by a track on said support for reciprocation between retracted and extended positions, said tray assembly including a bottom wall having a horizontal disposition in its extended position and an angularly disposed disposition in its retracted position, top and bottom combs mounted for reciprocation as a unit above said tray assembly to their extended position, means for reciprocating the combs and tray assembly simultaneously to their retracted position, and a stripper blade between said combs.

7. Apparatus comprising a molding press, means associated with said press for positioning molded parts at a first level and means for positioning a cull and runner at a second level, selectively actuable means movable into said press for receiving said parts and movable out of said press to its initial position for delivering the parts from said first level to an accumulation area below said initial position, and selectively actuable comb means movable into said press for receiving the cull and runner and movable out of said press to its initial position for delivering the same to a second accumulation area, said selectively actuatable means and said comb means being disposed one above the other and interconnected for simultaneous movement out of said press to their initial positions.

8. Apparatus in accordance with claim 7 including a stationary abutment for pushing the cull and runner off said comb means into said second accumulation area, and said parts being transferred from said first level to the first-mentioned accumulation area by tilting said selectively actuable means, said tilting being effected by a track curved downwardly and away from said press, said selectively actuable means including a member cooperating with said track so that the end thereof remote from said press is caused to move downwardly as said selectively actuable means is moved in a direction away from said press.

9. Apparatus comprising a molding press having a pair of cooperating platens, means associated with said press for positioning molded parts at a first level and means for positioning a cull and runner at a second level, said first and second means being associated with a single platen, selectively actuable means movable into the space between the platen for receiving said parts and movable out of said space to its initial position for delivering the parts from said first level to an accumulation area below said initial position, selectively actuable comb means movable into said space for receiving the cull and runner and movable out of said space to its initial position for delivering the same to a second accumulation area, said selectively actuable means and said comb means being disposed one above the other, and guide means having a downwardly inclined portion disposed outside the platens for guiding an end of said selectively actuable means through a downward path during movement towards its initial position whereby the selectively actuable means tilt to discharge said parts.

10. Apparatus comprising a molding press, means associated with said press for positioning molded parts at a first level, means for positioning a cull and a runner at a second level, selectively actuable means for receiving and delivering the parts from said first level to an accumulation area, and selectively actuable comb means for receiving the cull and runner and moving the same to a second accumulation area, said selectively actuable means includes a floating gear in meshing engagement with a stationary gear, and means for causing the floating gear to rotate about its axis while it rotates about the axis of the stationary gear.

11. A stripper comb assembly comprising top and bottom combs mounted for reciprocal movement as a unit, a tray assembly mounted for reciprocal movement, means on said tray assembly for preventing a cull and runner on one said combs from being stripped thereoff by a stripper blade until the combs are in at least a partly retracted position wherein the cull and runner may be discharged into a preselected accumulation area.

References Cited by the Examiner

UNITED STATES PATENTS

| | | | |
|---|---|---|---|
| 2,321,252 | 6/1943 | Sayre | 18—16 |
| 2,582,891 | 1/1952 | Strauss | 18—2 X |
| 2,923,976 | 2/1960 | Strauss | 18—30 |
| 2,983,953 | 5/1961 | Borah | 18—16 |

J. SPENCER OVERHOLSER, *Primary Examiner.*

J. H. FLINT, *Assistant Examiner.*